(12) United States Patent
Joten

(10) Patent No.: US 7,609,346 B2
(45) Date of Patent: Oct. 27, 2009

(54) LIQUID CRYSTAL DISPLAY DEVICE

(75) Inventor: Kazuhiro Joten, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 366 days.

(21) Appl. No.: 11/566,385

(22) Filed: Dec. 4, 2006

(65) Prior Publication Data

US 2007/0126960 A1 Jun. 7, 2007

(30) Foreign Application Priority Data

Dec. 5, 2005 (JP) .............................. 2005-350732

(51) Int. Cl.
*G02F 1/1335* (2006.01)
*C09K 19/02* (2006.01)

(52) U.S. Cl. ...................... 349/117; 349/180; 349/181

(58) Field of Classification Search ................. 349/117, 349/180, 181
See application file for complete search history.

(56) References Cited

U.S. PATENT DOCUMENTS

| | | | | |
|---|---|---|---|---|
| 6,922,220 B2* | 7/2005 | Okamoto et al. | ............ | 349/113 |
| 6,958,794 B2* | 10/2005 | Okamoto et al. | ............ | 349/113 |
| 7,023,510 B2* | 4/2006 | Okamoto et al. | ............ | 349/113 |
| 7,072,009 B2* | 7/2006 | Joten | ........................... | 349/96 |
| 7,092,052 B2* | 8/2006 | Okamoto et al. | ............ | 349/113 |
| 7,259,817 B2* | 8/2007 | Itou et al. | ................... | 349/117 |
| 2002/0063826 A1* | 5/2002 | Okamoto et al. | ............ | 349/117 |
| 2003/0086039 A1* | 5/2003 | Tanada et al. | ............... | 349/117 |

FOREIGN PATENT DOCUMENTS

JP 2001-272701 10/2001

OTHER PUBLICATIONS

U.S. Appl. No. 11/946,505, filed Nov. 28, 2007, Joten.
U.S. Appl. No. 11/621,299, filed Jan. 9, 2007, Joten.

* cited by examiner

*Primary Examiner*—Uyen Chau N Le
*Assistant Examiner*—Rhonda S Peace
(74) *Attorney, Agent, or Firm*—Oblon, Spivak, McClelland, Maier & Neustadt, L.L.P.

(57) ABSTRACT

A liquid crystal display device includes a liquid crystal display panel which is configured such that a liquid crystal layer including liquid crystal molecules, which are twist-aligned at a twist angle of 70°±10°, is held between a first substrate and a second substrate, and an optical element which is provided on an outer surface of the second substrate. The optical element includes a polarizer plate, a first retardation plate which imparts a phase difference of a ½ wavelength, and a second retardation plate which imparts a phase difference of a ¼ wavelength, and a retardation value Δn·d of the liquid crystal layer is set at 200 ±30 nm, where Δn is a refractive index anisotropy of the liquid crystal layer and d is a thickness of the liquid crystal layer.

12 Claims, 12 Drawing Sheets

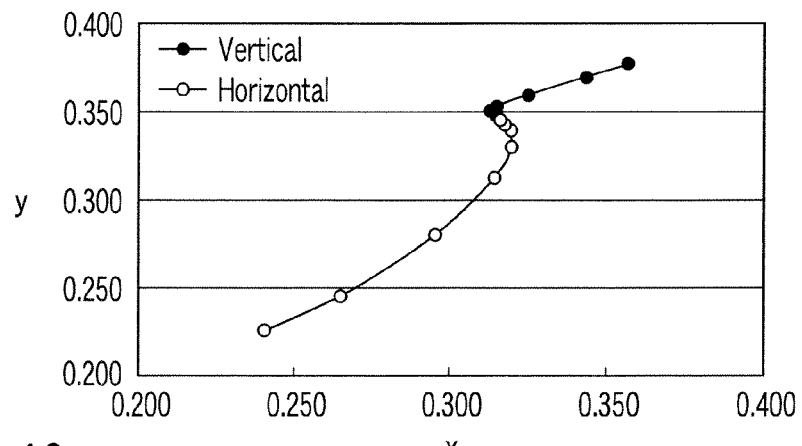
F I G. 16
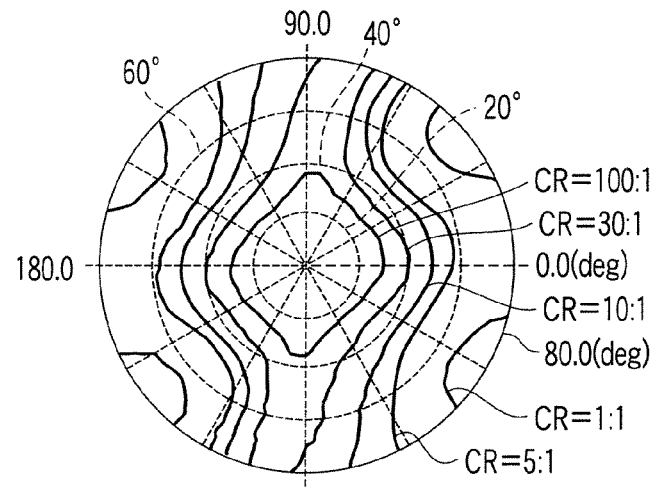
F I G. 17
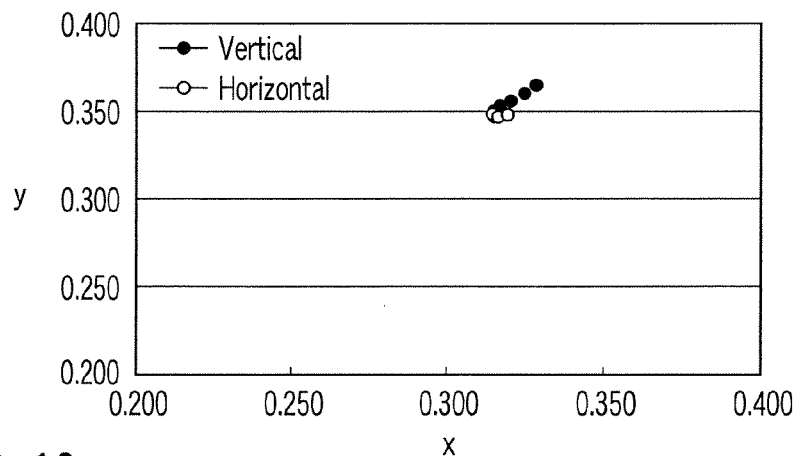
F I G. 18

LIQUID CRYSTAL DISPLAY DEVICE

CROSS-REFERENCE TO RELATED APPLICATIONS

This application is based upon and claims the benefit of priority from prior Japanese Patent Application No. 2005-350732, field Dec. 5, 2005, the entire contents of which are incorporated herein by reference.

BACKGROUND OF THE INVENTION

1. Field of the Invention

The present invention relates generally to a liquid crystal display device, and more particularly to a monochromatic reflective liquid crystal display device including a liquid crystal layer which contains twist-aligned liquid crystal molecules.

2. Description of the Related Art

A technique has been proposed to realize a reflective mode with good contrast by lowering a reflectance at a time of black display in a liquid crystal display device that is capable of performing reflective display (see, for instance, Jpn. Pat. Appln. KOKAI Publication No. 2001-272701).

In recent years, in the field of monochromatic reflective liquid crystal display devices that are used for electronic paper or the like, there has been a demand for realizing a chroma level close to that of a standard white board, that is, a high degree of whiteness with a low degree of coloring. Furthermore, in this type of liquid crystal display device, there is a demand for realizing luminosity close to that of a standard white board.

Besides, there is a demand for realizing a good display quality, not only when the screen is observed in a frontal direction (i.e. a normal direction to the screen) but also when the screen is observed in an oblique direction.

BRIEF SUMMARY OF THE INVENTION

The object of the present invention is to provide a liquid crystal display device with a good display quality.

According to an embodiment of the present invention, there is provided a liquid crystal display device comprising: a liquid crystal display panel which is configured such that a liquid crystal layer including liquid crystal molecules, which are twist-aligned at a twist angle of 70°±10°, is held between a first substrate having a plurality of reflection patterns protruding from a major surface of the first substrate and a second substrate which is disposed to be opposed to the first substrate; and an optical element which is provided on an outer surface of the second substrate, wherein the optical element includes a polarizer plate, a first retardation plate which is disposed between the polarizer plate and the liquid crystal display panel and imparts a phase difference of a ½ wavelength between light rays of a predetermined wavelength, which pass through a fast axis and a slow axis of the first retardation plate, and a second retardation plate which is disposed between the first retardation plate and the liquid crystal display panel and imparts a phase difference of a ¼ wavelength between light rays of a predetermined wavelength, which pass through a fast axis and a slow axis of the second retardation plate, and a retardation value $\Delta n \cdot d$ of the liquid crystal layer is set at 200 ±30 nm, where $\Delta n$ is a refractive index anisotropy of the liquid crystal layer and d is a thickness of the liquid crystal layer.

The present invention can provide a liquid crystal display device with a good display quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 is a chromaticity coordinate diagram showing the hue of a white screen in the liquid crystal display device according to the comparative example;

FIG. 17 is a characteristic diagram of the viewing angle dependency of a contrast ratio in a liquid crystal display device according to a first example of structure;

FIG. 18 is a chromaticity coordinate diagram showing the hue of a white screen in the liquid crystal display device according to the first example of structure;

DETAILED DESCRIPTION OF THE INVENTION

A liquid crystal display device according to an embodiment of the present invention will now be described with reference to the accompanying drawings. In this embodiment, a reflective liquid crystal display device, which has a normally white display mode and displays an image by using ambient light, is exemplified.

Figure 1:
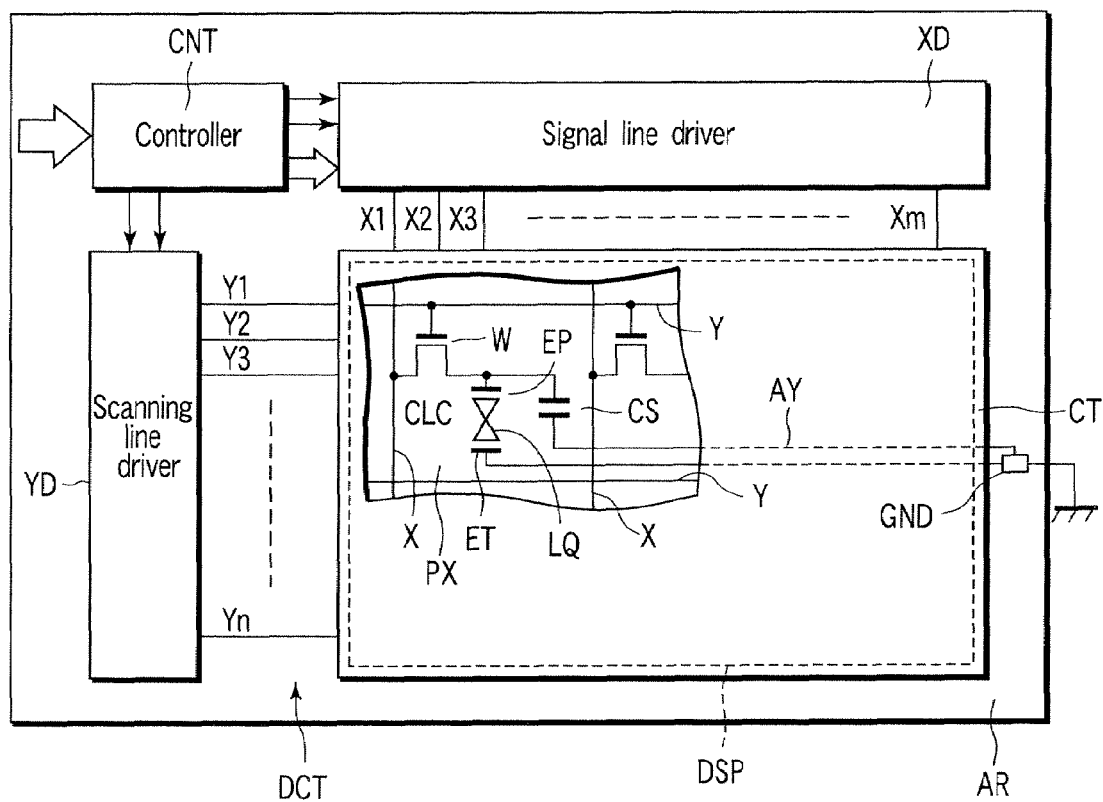
FIG. 1 schematically shows the structure of a liquid crystal display device according to an embodiment of the present invention.
Figure 2:
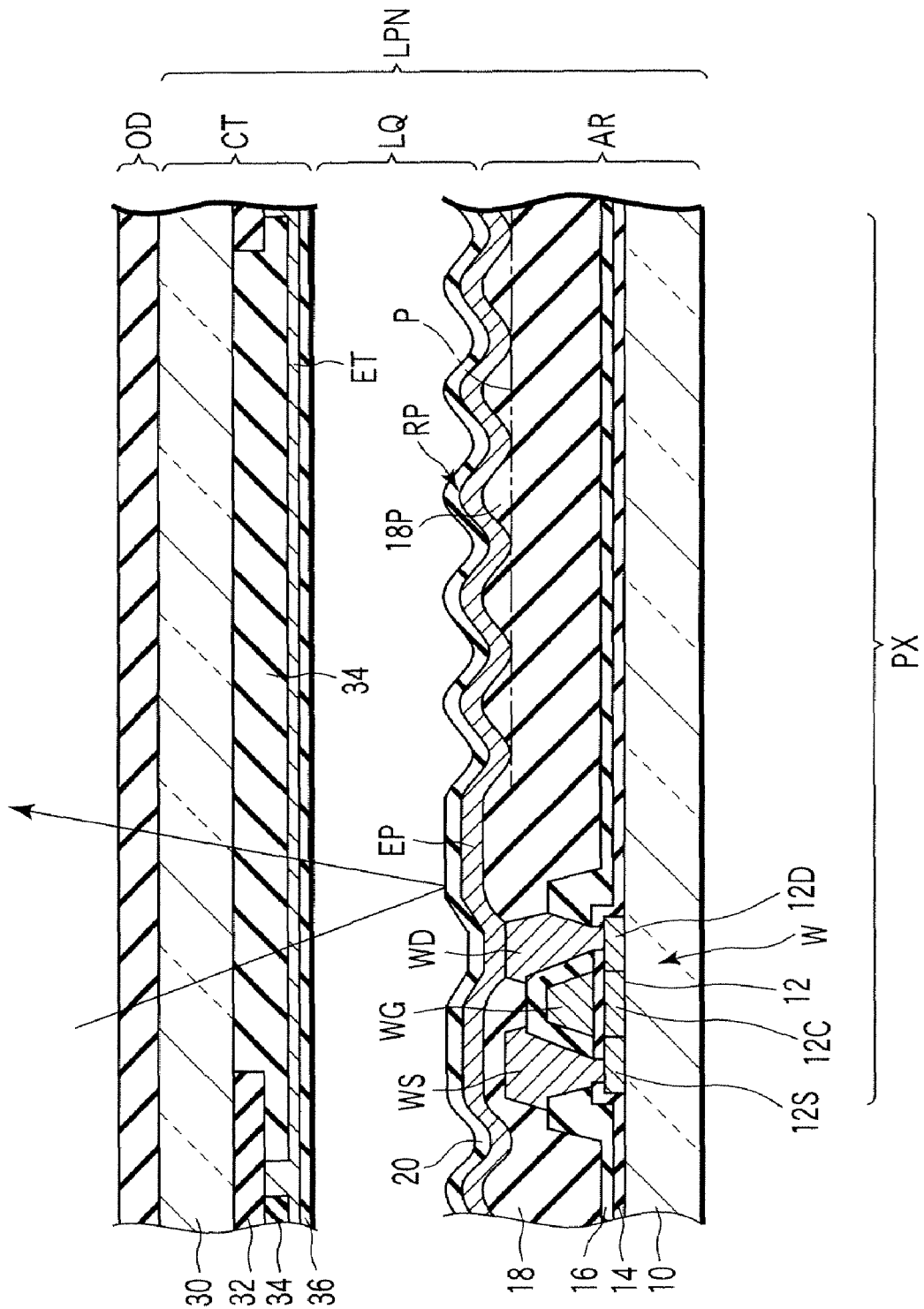
FIG. 2 schematically shows a cross-sectional structure of the liquid crystal display device shown in FIG. 1.

As is shown in FIG. 1 and FIG. 2, the liquid crystal display device is an active-matrix-type reflective color liquid crystal device, which includes a liquid crystal display panel LPN. The liquid crystal display panel LPN is configured to include an array substrate (first substrate) AR, a counter-substrate (second substrate) CT which is disposed to be opposed to the array substrate AR, and a liquid crystal layer LQ which is held between the array substrate AR and the counter-substrate CT. The liquid crystal display device includes an optical element OD which is provided on one of outer surfaces of the liquid crystal display panel LPN (i.e. an outer surface of the counter-substrate CT, which is opposed to the other outer surface thereof facing the liquid crystal layer LQ).

The liquid crystal display device includes a plurality of pixels PX which are arrayed in a matrix of m×n in a display region DSP that displays an image.

The array substrate AR is formed by using an insulating substrate 10 having light transmissivity, such as a glass plate or a quartz plate. Specifically, the array substrate AR includes, in the display region DSP, an (m×n) number of pixel electrodes EP which are disposed in the respective pixels, an n-number of scanning lines Y (Y1 to Yn) which are formed in the row direction of the pixel electrodes EP, an m-number of signal lines X (X1 to Xm) which are formed in the column direction of the pixel electrodes EP, an (m×n) number of switching elements W which are disposed in regions including intersections between the scanning lines Y and signal lines X in the respective pixels PX, and storage capacitance lines AY which are capacitive-coupled to the pixel electrodes EP so as to constitute storage capacitances CS in parallel with liquid crystal capacitances CLC.

Further, in a driving circuit region DCT in the vicinity of the display region DSP, the array substrate AR includes at least a part of a scanning line driver YD which is connected to the n-number of scanning lines Y and at least a part of a signal line driver XD which is connected to the m-number of signal lines X. The scanning line driver YD successively supplies scanning signals (driving signals) to the n-number of scanning lines Y on the basis of the control by a controller CNT. The signal line driver XD supplies, under the control of the controller CNT, video signals (driving signals) to the m-number of signal lines X at a timing when the switching elements W of each row are turned on by the scanning signal. Thereby, the pixel electrodes EP in each row are set at pixel potentials corresponding to the video signals that are supplied via the associated switching elements W.

Each of the switching elements W is, for instance, an n-channel thin-film transistor, and includes a semiconductor layer 12 which is disposed on the insulating substrate 12. The semiconductor layer 12 can be formed by using, e.g. polysilicon or amorphous silicon. In this embodiment, the semiconductor layer 12 is formed of polysilicon. The semiconductor layer 12 includes a source region 12S and a drain region 12D, between which a channel region 12C is interposed. The semiconductor layer 12 is covered with a gate insulation film 14.

A gate electrode WG of the switching element W is connected to one associated scanning line Y (or formed integral with the scanning line Y). The gate electrode WG, together with the scanning line Y and storage capacitance line AY, is disposed on the gate insulation film 14. The gate electrode WG, scanning line W and storage capacitance line AY are covered with an interlayer insulation film 16.

A source electrode WS and a drain electrode WD of the switching element W are disposed on the interlayer insulation film 16 on both sides of the gate electrode WG. The source electrode WS is connected to one associated signal line X (or formed integral with the signal line X) and is put in contact with the source region 12S of the semiconductor layer 12. The drain electrode WD is connected to one associated pixel electrode EP (or formed integral with the pixel electrode EP) and is put in contact with the drain region 12D of the semiconductor layer 12. The source electrode WS, drain electrode WD and signal line X are covered with an organic insulation film 18.

The pixel electrode EP is disposed on the organic insulation film 18 and is electrically connected to the drain electrode WD. The pixel electrode EP is formed of a light-reflective metal film of, e.g. aluminum. The organic insulation film 18 has protrusion patterns 18P on its surface (i.e. the surface on which the pixel electrode is disposed), which protrude from a major surface P of the array substrate AR. In other words, the surface of the organic insulation film 18 is an uneven surface. For the purpose of convenience, the surface that is defined by the bottom of the uneven surface is set to be the substrate major surface P. Alternatively, the surface of the interlayer insulation film 16 on which the organic insulation film 18 is stacked, or the surface of the insulating substrate 10 on which the organic insulation film 18 is disposed may be defined as the substrate major surface. Whichever definition of the substrate major surface is adopted, the protrusion patterns 18P protrude from the substrate major surface P toward the counter-substrate CT.

The pixel electrode EP covers the protrusion patterns 18P of the organic insulation film 18 and forms reflection patterns RP. Specifically, the reflection patterns RP correspond to patterns protruding from the substrate major surface P toward the counter-substrate CT. A plurality of reflection patterns RP is disposed within every 1 pixel. The pixel electrode EP, which is disposed in each associated pixel PX, is covered with an alignment film 20.

The counter-substrate CT is formed by using a light-transmissive insulating substrate 30 of, e.g. glass or quartz. Specifically, the counter-substrate CT includes, in the display region DSP, a black matrix 32 which partitions the pixels PX, a color filter 34 which is surrounded by the black matrix 32 and is disposed in association with each pixel, and a counter-electrode ET.

The black matrix 32 is disposed to be opposed to wiring lines, such as scanning lines Y and signal lines X, which are provided on the array substrate AR. The color filter 34 is formed of color resins of a plurality of colors, for example, the three primary colors of red, blue and green. The red color resin, blue color resin and green color resin are disposed in association with a red pixel, a blue pixel and a green pixel, respectively.

The counter-electrode ET is disposed to be opposed to the pixel electrodes EP of the plural pixels PX. The counter-electrode ET is formed of a light-transmissive metal film of, e.g. indium tin oxide (ITO). The counter-electrode ET is covered with an alignment film 36.

When the counter-substrate CT and array substrate AR are disposed such that their alignment films 20 and 36 are opposed, a predetermined gap is provided by spacers (not shown) which are disposed between the alignment films 20 and 36. The liquid crystal layer LQ is composed of a liquid crystal composition including liquid crystal molecules, which is sealed in the gap between the alignment film 20 of the array substrate AR and the alignment film 36 of the counter-substrate CT. In this embodiment, the liquid crystal layer LQ includes liquid crystal molecules which are twist-aligned at a twist angle of 70°±10°. The twist angle of the liquid crystal molecules is controllable by a rubbing treatment which is performed on the alignment film 20 and alignment film 36.

The optical element OD controls a polarization state of light that passes therethrough. Specifically, the optical element OD controls the polarization state of light passing through the optical element OD so that elliptically polarized or circularly polarized light may be incident on the liquid crystal layer LQ. Thus, the polarization state of ambient light, which is incident on the optical element OD, is converted to a predetermined polarization state while the ambient light is passing through the optical element OD. The ambient light, which emerges from the optical element OD, enters the liquid crystal layer LQ while keeping the predetermined polarization state.

Figure 3:
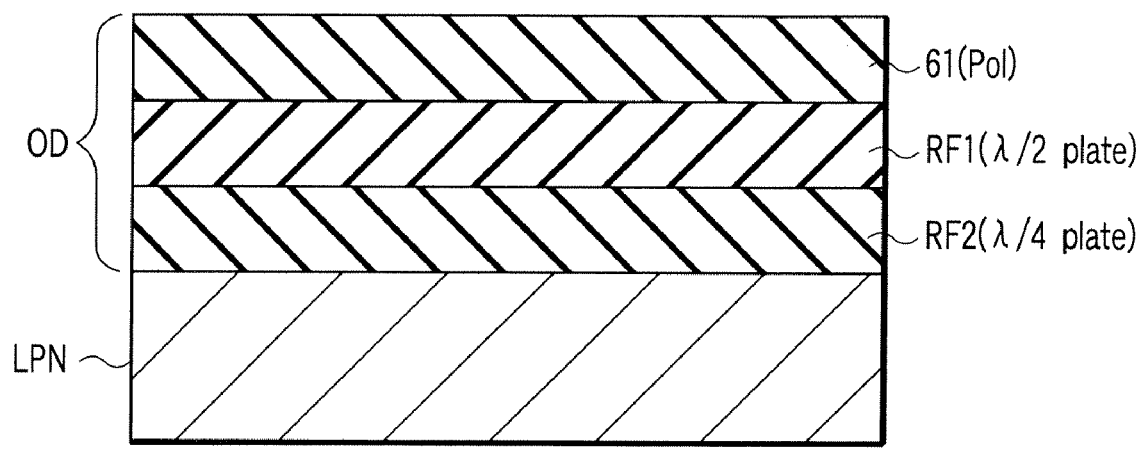
FIG. 3 schematically shows the structure of an optical element which is applicable to the liquid crystal display device shown in FIG. 2.

As is shown in FIG. 3, the optical element OD includes a polarizer plate 61, a first retardation plate RF1 which is disposed between the polarizer plate 61 and the liquid crystal display panel LPN (to be more specific, between the polarizer plate 61 and counter-substrate CT), and a second retardation plate RF2 which is disposed between the first retardation plate RF1 and the liquid crystal display panel LPN (to be more specific, between the first retardation plate RF1 and counter-substrate CT).

The polarizer plate 61 used in this embodiment has an absorption axis and a transmission axis which intersect at right angles in a plane perpendicular to the direction of travel of light. The polarizer plate 61 extracts light having a unidirectional oscillation plane parallel to the transmission axis, i.e. linearly polarized light, from the light having oscillation planes in random directions.

Each of the first retardation plate RF1 and second retardation plate RF2 included in the optical element OD has a slow axis and a fast axis which intersect at right angles. In discussing birefringence, the slow axis corresponds to an axis in which a refractive index is relatively large, and the fast axis corresponds to an axis in which a refractive index is relatively small. It is assumed that the slow axis agrees with an oscillation plane of extraordinary rays, and that the fast axis agrees with an oscillation plane of ordinary rays. When the refractive index of ordinary rays and the refractive index of extraordinary rays are no and ne, respectively, and the thickness of the retardation plate extending in the direction of travel of rays is d, the retardation value $\Delta n \cdot d$ (nm) of the retardation plate is defined by (ne·d−no·d) (i.e. $\Delta n$=ne−no).

The first retardation plate RF1 is a so-called ½ wavelength plate which imparts a phase difference of ½ wavelength between light rays of a predetermined wavelength which pass through the fast axis and slow axis. The second retardation plate RF2 is a so-called ¼ wavelength plate which imparts a phase difference of ¼ wavelength between light rays of a predetermined wavelength which pass through the fast axis and slow axis.

The combination of the first retardation plate RF1 and second retardation plate RF2 is disposed such that the slow axis of each of these retardation plates forms, in the plane thereof, a predetermined angle (acute angle), relative to the absorption axis (or transmission axis) of the polarizer plate 61. Thereby, the combination of the first retardation plate RF1 and second retardation plate RF2 functions to convert the linearly polarized light, which emerges from the polarizer plate 61, to elliptically polarized light or circularly polarized light having a predetermined ellipticity (=amplitude in minor axis/amplitude in major axis).

In general, a birefringent material, of which the retardation plate is formed, has such characteristics that the refractive index no for ordinary rays and the refractive index ne for extraordinary rays depend on the wavelength of light. Thus, the retardation value $\Delta n \cdot d$ of the retardation plate depends on the wavelength of passing light. With the above-described structure, at least two kinds of retardation plates (½ wavelength plate and ¼ wavelength plate) are combined, and the wavelength dependency of the retardation value of the retardation plate is relaxed. Thereby, in the entire range of wavelengths that are used for color display, a predetermined retardation is imparted and a desired polarization state is obtained.

Figure 4:
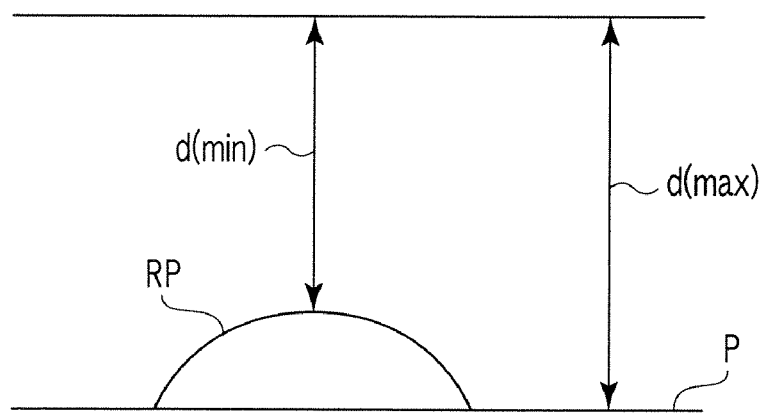
FIG. 4 is a view for explaining the thickness of a liquid crystal layer.

In the above-described reflective liquid crystal display device, there is a demand for obtaining reflection characteristics with little variance in display quality. A description will now be given of the reflection modulation ratio (normalized value) in relation to $\Delta n \cdot d$ of the liquid crystal layer LQ, with the twist angle of liquid crystal molecules in the liquid crystal layer LQ being used as a parameter. $\Delta n$ is a value indicative of the refractive index anisotropy of the liquid crystal layer LQ ($\Delta n$=ne−no), and d corresponds to the thickness of the liquid crystal layer LQ. The liquid crystal composition that forms the liquid crystal layer LQ is the same. It is assumed that in the reflective liquid crystal display device having reflection patterns RP protruding from the substrate major surface P, the thickness d of the liquid crystal layer LQ is given as a mean value of the thickness d (min) of a narrowest part (top portion of the reflection pattern RP) and the thickness d (max) of a widest part (bottom part of the reflection pattern RP), as shown in FIG. 4.

Figure 5:
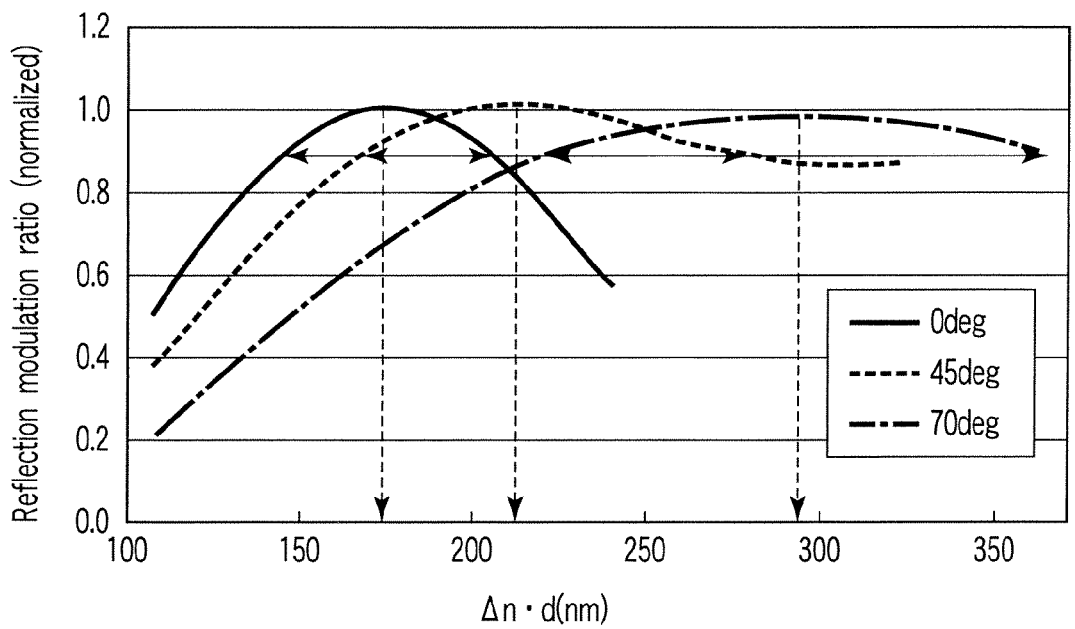
FIG. 5 shows a relationship between a reflection modulation ratio and $\Delta n \cdot d$ of the liquid crystal layer.

As shown in FIG. 5, if the tolerable range of the reflection modulation ratio is 90% or more, the margin of $\Delta n \cdot d$ at this time tends to become smaller as the twist angle becomes smaller, and $\Delta n \cdot d$ decreases (in other words, as the twist angle becomes smaller, the value of $\Delta n \cdot d$, at which the maximum reflection modulation ratio is obtained, tends to decrease). It is thus necessary to form a small gap (d) between the array substrate AR and counter-substrate CT and to control the gap with high precision.

In this embodiment, paying attention to the tendency that the margin of $\Delta n \cdot d$ increases as the twist angle becomes greater, the twist angle was set in the range of 70°±10°. Thereby, the margin of $\Delta n \cdot d$ was increased to about 150 nm. It is generally understood that when the twist angle is set at 70°, $\Delta n \cdot d$ should preferably be set at about 270 nm so as to obtain the maximum reflection modulation ratio, on the basis of the relationship as shown in FIG. 5.

Figure 6:
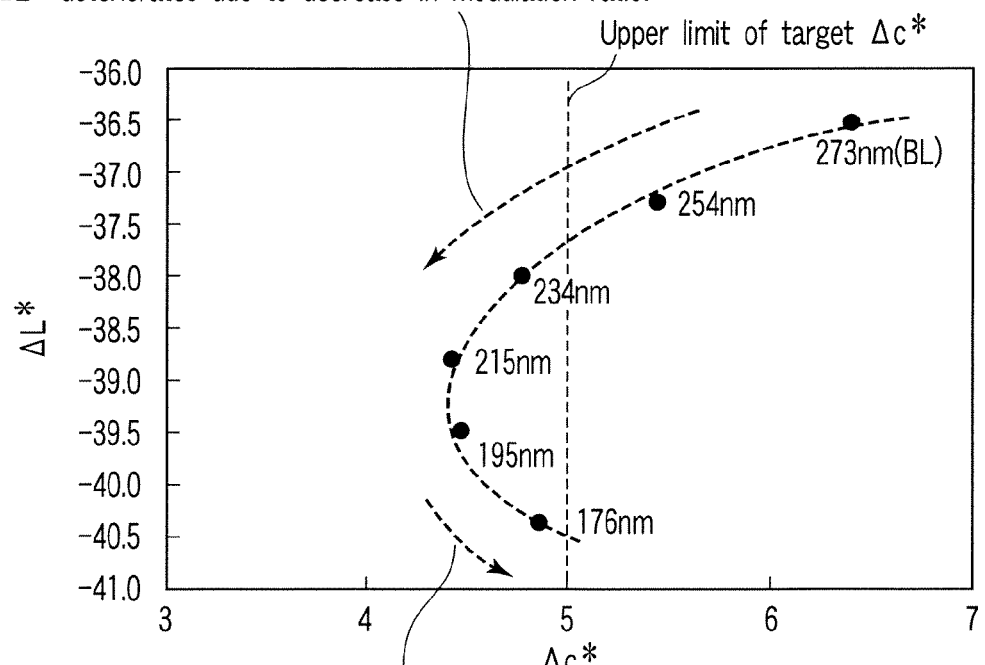
FIG. 6 shows a relationship between $\Delta n \cdot d$ of the liquid crystal layer and reflection characteristics.

However, when a monochromatic reflective liquid crystal display device is to be constructed, there is a demand for realizing a chroma level close to that of a standard white board, that is, a high degree of whiteness with a low degree of coloring. The inventor has found that in the liquid crystal display device in which the twist angle is set in the range of 70°±10°, there is a correlation between Δn·d and chroma (ΔC*), as shown in FIG. 6. The reflection characteristics were measured by CM-508D (manufactured by MINOLTA) to which a diffusion light source is applied. In FIG. 6, the abscissa indicates chroma (ΔC*), the ordinate indicates luminosity (ΔL*), and the origin indicates the value of the standard white board. In order to obtain a good whiteness, it is required that ΔC* be less than 5.0 as a reference value.

The inventor has found that the whiteness with a low degree of coloring can be obtained by setting Δn·d of the liquid crystal layer LQ at 200 ±30 nm on the basis of the relationship as shown in FIG. 6. Conventionally, it is said that Δn·d should preferably be set at about 270 nm when the twist angle is set at 70°. However, in order to obtain a higher degree of whiteness, it is preferable to set Δn·d in the range of 200 ±30 nm. Thus, the value of ΔC* decreased to less than 5.0.

As described above, in the liquid crystal display device, the gap control is made relatively easily by setting the twist angle in the range of 70°±10°. In this device, by setting Δn·d of the liquid crystal layer LQ in the range of 200±30 nm, the chroma level close to that of the standard white board can be obtained when the screen is observed in the frontal direction (i.e. approximately in the normal direction of the liquid crystal display panel). Thus, good display quality can be obtained.

Figure 7:
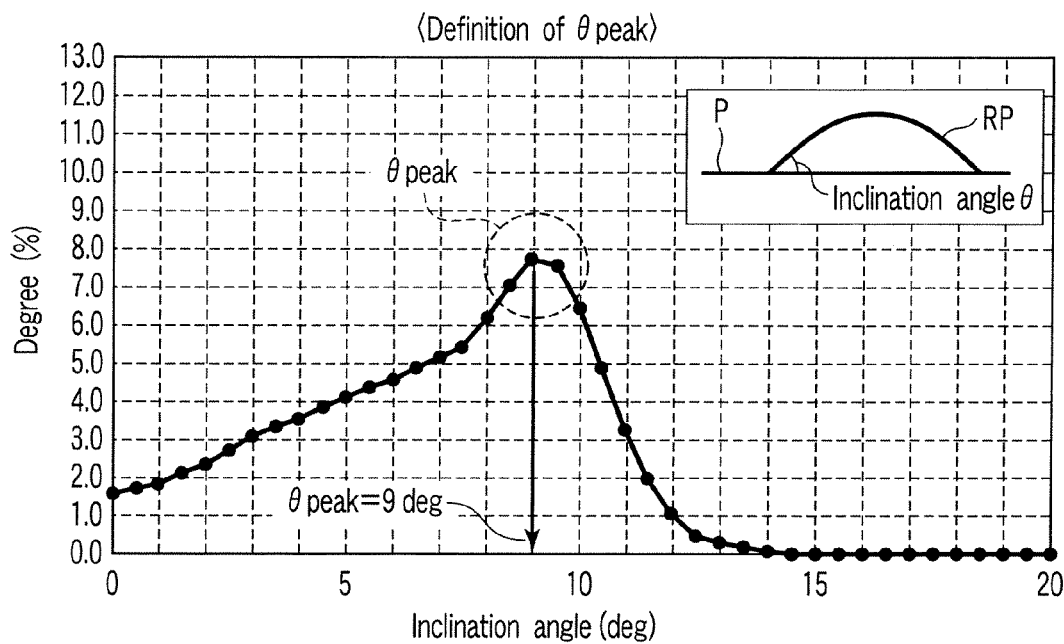
FIG. 7 is a view for explaining a maximum inclination angle (θ peak) of a reflection pattern.

In addition to the study of the above-described optimal range of Δn·d, the inventor paid attention to a maximum inclination angle of the reflection pattern RP, and an attempt was made to further decrease the chroma level, that is, to improve the degree of whiteness. As shown in FIG. 7, the maximum inclination angle θ peak is defined as an inclination angle with a highest degree (%) of inclination angles θ to the substrate major surface P of the reflection pattern RP. In the example shown in FIG. 7, the maximum inclination angle is 9°.

Figure 8:
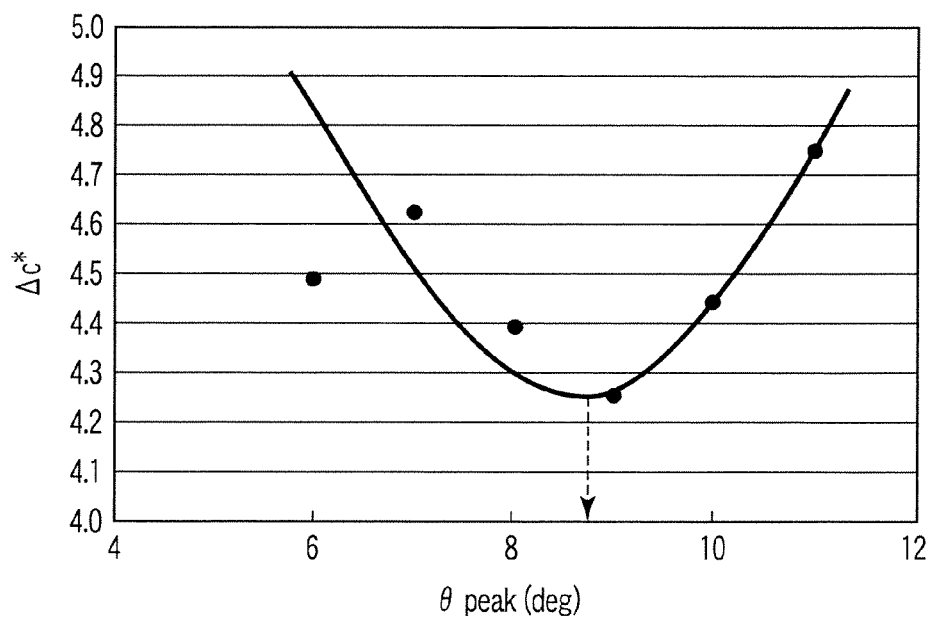
FIG. 8 shows a relationship between a chroma ($\Delta C^*$) and a maximum inclination angle of a reflection pattern.

The inventor has found that there is a correlation between the maximum inclination angle (θ peak) and the chroma level (ΔC*), as shown in FIG. 8. The twist angle was set at 70°, and the Δn·d of the liquid crystal layer LQ was set at 200 nm. Based on the relationship shown in FIG. 8, the maximum inclination angle was set at 8° to 9°, and a good chroma level was obtained. It is preferable, as described above, to set the Δn·d of the liquid crystal layer LQ in the range of 200 ±30 nm. In this range, the same measurement was conducted, and it was found that the reflection pattern RP should preferably be formed such that the maximum inclination angle may become 9°±2°, on the basis of the correlation between the maximum inclination angle (θ peak) and the chroma level (ΔC*).

By optimizing the maximum inclination angle of the reflection pattern as described above, a chroma level still closer to that of the standard white board can be obtained. Therefore, a better display quality can be obtained.

As has been described above, in constructing the monochromatic reflective liquid crystal display device, the Δn·d of the liquid crystal layer was set in the optimal range, and the chroma level was made close to that of the standard white board. However, as is clear from the relationship shown in FIG. 6, the luminosity (ΔL*) deteriorates if the Δn·d is set at about 200 nm in the liquid crystal display device in which the twist angle is set in the range of 70°±10°. As a result, the reflection modulation ratio decreases. In order to obtain an adequate luminosity, it is required that ΔL* be greater than −45 as a reference value. In the case where Δn·d is set at about 200 ±30 nm, as shown in FIG. 6, the requirement for the reference value is satisfied, but a further improvement in luminosity is desired.

Figure 9:
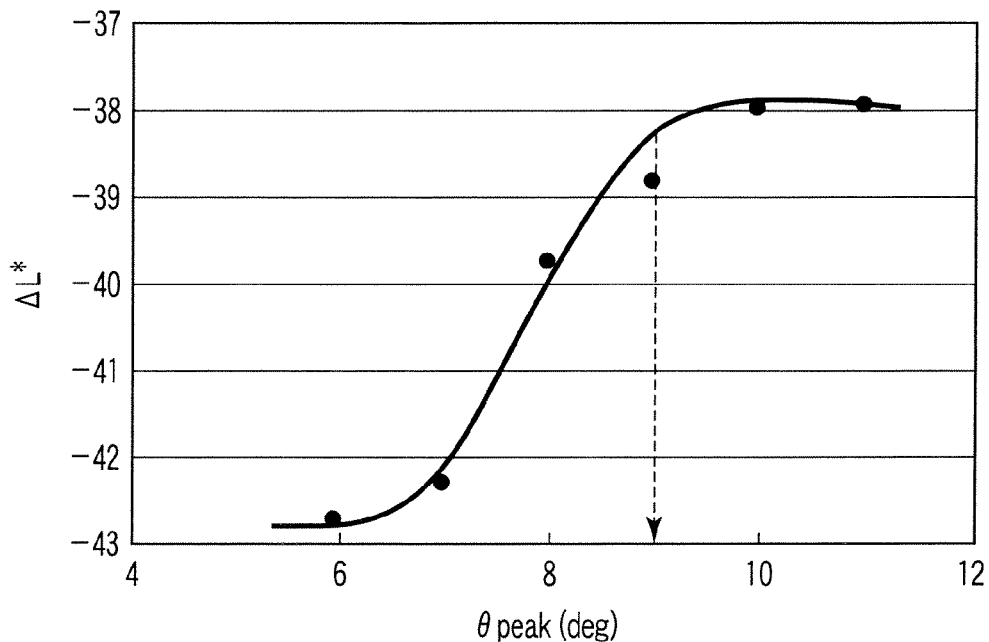
FIG. 9 shows luminosity ($\Delta L^*$) and a maximum inclination angle of a reflection pattern.

Then inventor paid attention to the maximum inclination angle of the reflection pattern RP, and attempted to further improve the luminosity. The inventor has found that there is a correlation between the maximum inclination angle (θ peak) and the luminosity (ΔL*), as shown in FIG. 9. The twist angle was set at 70°, and the Δn·d of the liquid crystal layer LQ was set at 200 nm. Based on the relationship shown in FIG. 9, the maximum inclination angle was set at 8° or more, and a high luminosity was obtained. It is preferable, as described above, to set the Δn·d of the liquid crystal layer LQ in the range of 200 ±30 nm. In this range, the same measurement was conducted, and the same measurement result was obtained.

By optimizing the maximum inclination angle of the reflection pattern as described above, a chroma level still closer to that of the standard white board can be obtained. Therefore, a better display quality can be obtained.

In order to improve the luminosity, it is also effective to apply a white-based polarizer plate as the polarizer plate 61 of the optical element OD. For instance, EGW1225DUAG30 (manufactured by Nitto Denko) is applicable as the white-based polarizer plate.

Figure 10:
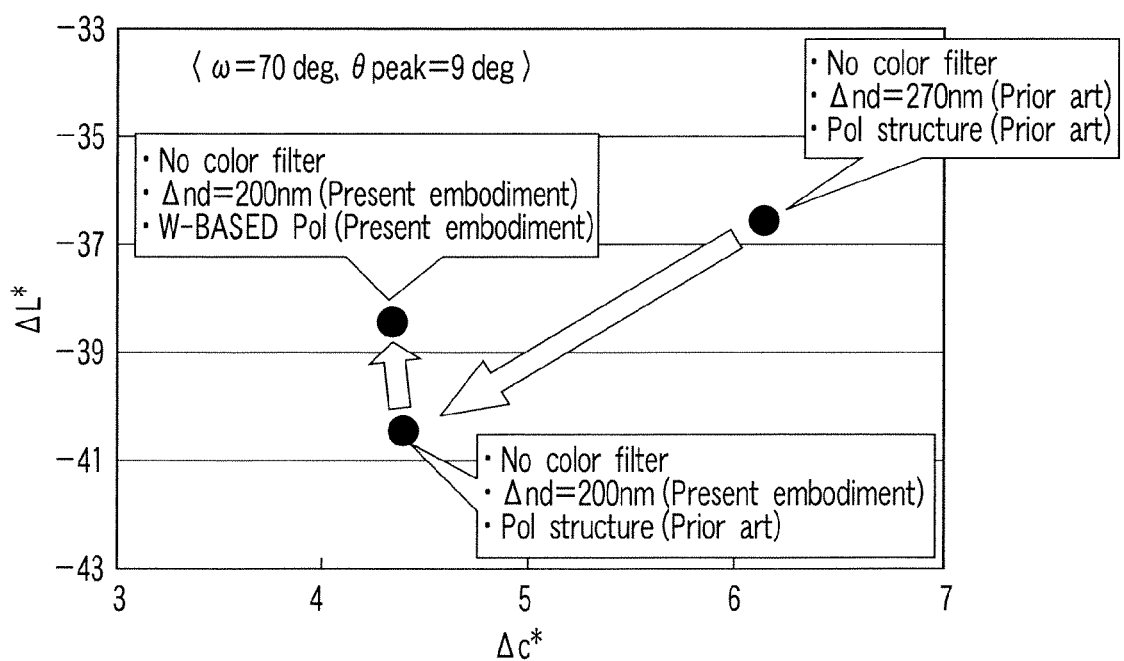
FIG. 10 shows reflection characteristics in a case where a white-based polarizer plate is applied.

A comparison in display quality was conducted with the application of the white-based polarizer plate. As shown in FIG. 10, as regards the liquid crystal display device in which the twist angle (ω) is set at 70° and the maximum inclination angle (θ peak) is set at 9°, the reflection characteristics were measured by CM-508D (manufactured by MINOLTA) to which a diffusion light source is applied. In FIG. 10, the abscissa indicates chroma (ΔC*), and the ordinate indicates luminosity (ΔL*). In any of the examples, the liquid crystal display panel has no color filter (CF).

In the case where the Δn·d was set at 270 nm and a conventional SEG1425DUAG30 (manufactured by Nitto Denko) was applied as the polarizer plate (Pol) 61, good chroma was not obtained. By contrast, if the Δn·d was simply changed to 200 nm, good chroma (ΔC* <5) was obtained. When Δn·d was set at 200 nm and the white-based polarizer plate of EGW1225DUAG30 (manufactured by Nitto Denko) was applied as the polarizer plate 61, a better chroma was obtained and an adequate luminosity was obtained.

By using the white-based polarizer plate as the polarizer plate, a chroma level still closer to that of the standard white board can be obtained. Therefore, a better display quality can be obtained.

Further, as regards the reflective liquid crystal display device, the reflection characteristics, which are based on the shape of the reflection pattern RP, were studied.

In the reflective liquid crystal display device having, as the reflection patterns RP, hemispherical patterns, that is, patterns with circular shapes in the plane of the substrate major surface, or patterns with substantially regular-hexagonal shapes in the plane of the substrate major surface, relatively good reflection characteristics were obtained and the luminosity (ΔL*) was greater than the reference value of −45. It was made clear that a still higher luminosity was obtained in the reflective liquid crystal display device having reflection patterns RP each with a shape having a major axis in the plane of the substrate major surface.

Figure 11A:
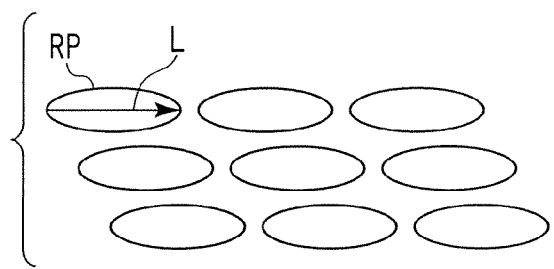
FIG. 11A is a plan view showing an example of a desired shape of a reflection pattern.

Specifically, in an example shown in FIG. 11A, each of reflection patterns RP has an elliptic shape with a major axis L in the plane of the substrate major surface. The reflection patterns RP are disposed in every 1 pixel such that the major axes L thereof are substantially parallel.

Figure 11B:
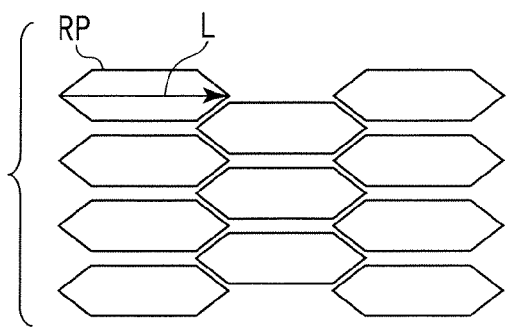
FIG. 11B is a plan view showing another example of the desired shape of the reflection pattern.

In an example shown in FIG. 11B, each of reflection patterns RP has a hexagonal shape with a major axis L in the plane of the substrate major surface. The reflection patterns RP are disposed in every 1 pixel such that the major axes L thereof are substantially parallel.

In the reflective liquid crystal display device to which these reflection patterns RP are applied, the directivity of reflective light is improved. In particular, a very high luminosity was obtained in reflection characteristics in a case where a point light source was applied.

Figure 12:
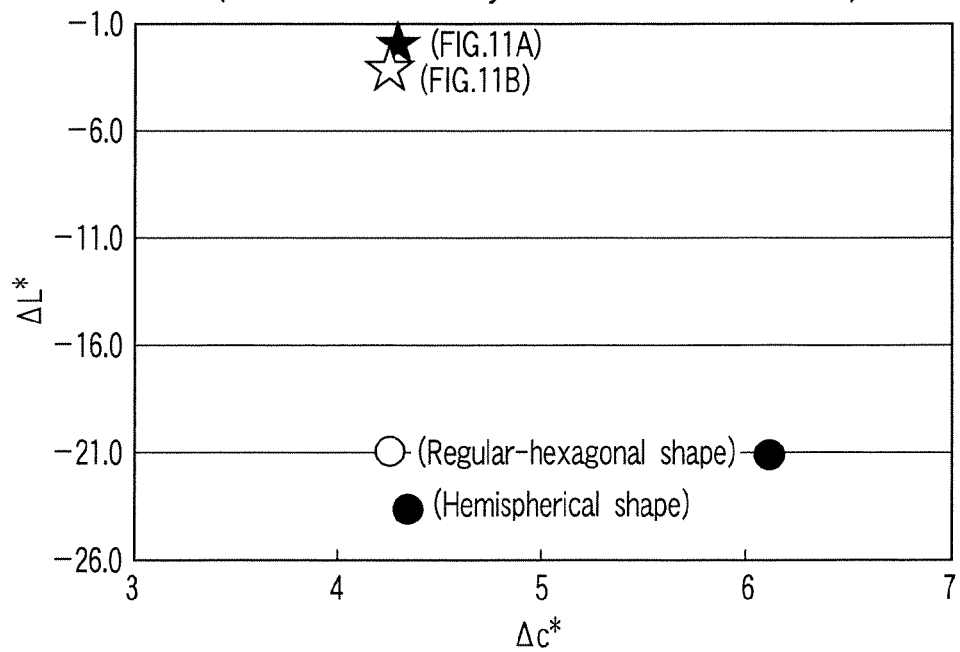
FIG. 12 shows a comparison result of reflection characteristics according to shapes of the reflection pattern.

A comparison in display quality, which is based on shapes of reflection patterns, was conducted. As shown in FIG. 12, reflection characteristics were measured by using a DMS (manufactured by autronic-MELCHERS GmbH) to which a point light source is applied, and by setting the incidence angle at 30° and the light reception angle at 5°. In FIG. 12, the abscissa indicates chroma ($\Delta C^*$), the ordinate indicates luminosity ($\Delta L^*$), and the origin indicates the value of the standard white board.

The luminosity was −20 or less in the case where the hemispherical reflection patterns or regular-hexagonal reflection patterns were applied. By contrast, in the case where the elliptical reflection patterns as shown in FIG. 11A and the hexagonal reflection patterns each having the major axis as shown in FIG. 11B are applied, the luminosity was −5 or more, which is substantially equal to that of the standard white board.

By optimizing the reflection patterns as described above, a chroma level still closer to that of the standard white board can be obtained. Therefore, a better display quality can be obtained.

Figure 13:
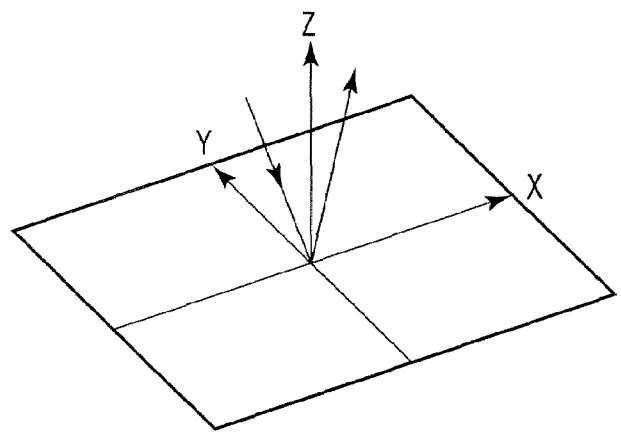
FIG. 13 is a view for explaining the directivity of reflection light according to reflection patterns.

In the case where the reflection patterns as shown in FIG. 11A or 11B are applied, it is preferable to set their major axes substantially in parallel to the horizontal direction (X axes) of the screen (or substrate major surface) as shown in FIG. 13. This horizontal axis corresponds to, for example, the row direction in the display region, that is, the direction parallel to the scanning line Y. With this setting, ambient light, which is incident in the vertical direction (Y axis) of the screen, can be reflected toward the vicinity of the normal direction (Z axis) of the screen with good directivity, and the luminosity can further be improved.

As has been described above, in the monochromatic reflective liquid crystal display device including twist-aligned liquid crystal molecules with a twist angle of 70°±10°, the retardation value $\Delta n \cdot d$ of the liquid crystal layer was set at 200 ±30 nm, whereby the desired chroma was obtained. In addition, the maximum inclination angle of the reflection pattern was set at 9°±2°. Thereby, the chroma was further improved and the luminosity was successfully increased. Furthermore, by using the white-based polarizer plate, the luminosity was further improved. Besides, by applying the reflection patterns each having the shape with the major axis in the plane of the substrate major surface, the luminosity was further improved.

In particular, when attention is paid to the display quality in the case of observing the screen in the frontal direction (approximately in the normal direction of the screen), the application of these structures is particularly effective in improving the display quality.

Next, paying attention to the display quality in the case of observing the screen in an oblique direction, a method of improving the display quality is discussed.

For the purpose of convenience, an X axis and a Y axis, which are perpendicular to each other, are defined in a plane parallel to the major surface of the array substrate AR (or counter-substrate CT) in the case where the liquid crystal display device is observed from the counter-substrate side. A Z axis is defined as a normal direction to this plane. The term "in-plane" refers to "in the plane defined by the X axis and Y axis". It is assumed that the X axis corresponds to the horizontal direction of the screen (e.g. the row direction in the display region). It is assumed that the Y axis corresponds to the vertical direction of the screen (e.g. the column direction in the display region). It is assumed that a direction (0° azimuth) on the positive (+) side of the X axis corresponds to the right side of the screen, and a direction (180° azimuth) on the negative (−) side of the X axis corresponds to the left side of the screen. Further, it is assumed that a direction (90° azimuth) on the positive (+) side of the Y axis corresponds to the upper side of the screen, and a direction (270° azimuth) on the negative (−) side of the Y axis corresponds to the lower side of the screen.

Figure 14:
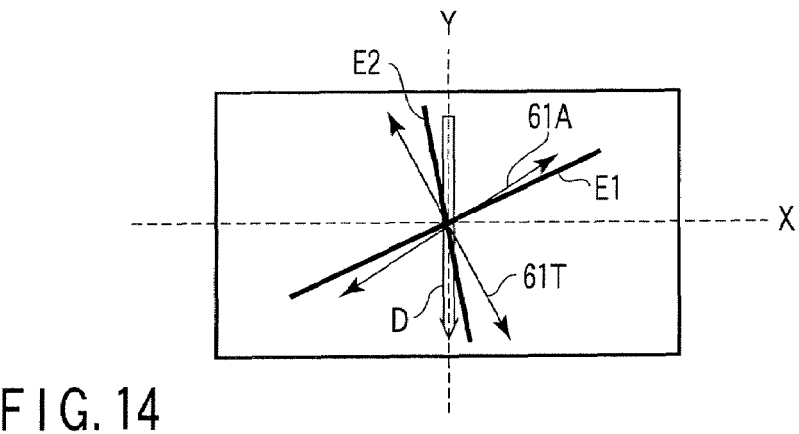
FIG. 14 shows a relationship between the director of liquid crystal molecules, and the transmission axis and absorption axis of a polarizer plate, the slow axis of a first retardation plate and the slow axis of a second retardation plate, which constitute the optical element.

As shown in FIG. 14, in the liquid crystal display panel LPN, the director D of liquid crystal molecules is set at 270° azimuth. In the optical element OD, an absorption axis 61A of the polarizer plate 61 is set at 105° azimuth, a slow axis E1 of the first retardation plate RF1 is set at 32° azimuth, and a slow axis E2 of the second retardation plate RF2 is set at 94° azimuth. An in-plane phase difference of the first retardation plate RF1 is set at 265 nm, and an in-plane phase difference of the second retardation plate R2 is set at 118 nm.

Figure 15:
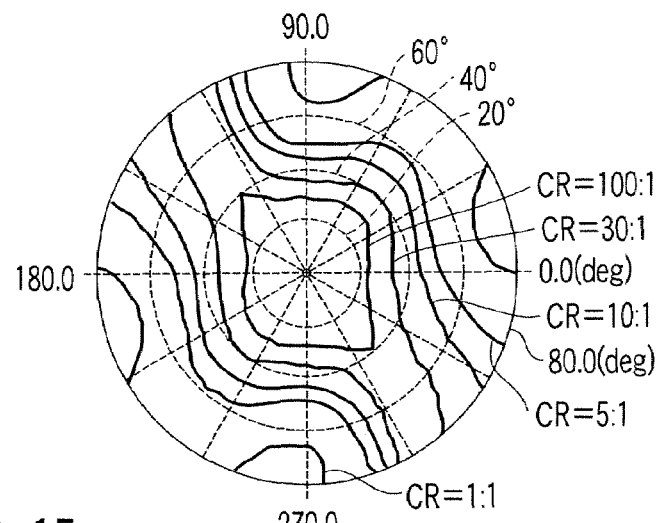
FIG. 15 is a characteristic diagram of the viewing angle dependency of a contrast ratio in a liquid crystal display device according to a comparative example.

The viewing angle dependency of the contrast ratio (CR) of the liquid crystal display device with the above-described structure was simulated, and a simulation result as shown in FIG. 15 was obtained. In FIG. 15, the center corresponds to the normal direction of the liquid crystal display panel. Concentric circles defined about the normal direction indicate tilt angles to the normal direction, and correspond to 20°, 40°, 60° and 80°, respectively. The characteristic diagram of FIG. 15 was obtained by connecting regions corresponding to iso-contrast ratios in the respective azimuth directions. As shown in FIG. 15, asymmetric contrast characteristics were obtained in the vertical direction (90°-270° azimuth) and horizontal direction (0°-180° azimuth) of the screen. Gray level inversion occurred at 0°, 90°, 180° and 270° azimuth.

As regards the liquid crystal display device with the above-described structure, the variation of hue on the screen was measured when the viewing angles were varied in the vertical direction of the screen and the horizontal direction of the screen, and the measured variation was represented on a chromaticity coordinate diagram. FIG. 16 shows the obtained result. In the monochromatic reflective liquid crystal display device, it is preferable that no coloring occurs in the white-display screen even if the viewing angle varies. However, in the liquid crystal display device with this structure, it was confirmed that the variation of hue is large, that is, coloring occurs depending on viewing angles, in the vertical and horizontal directions.

Examples of structure for solving this problem will be described below.

In a liquid crystal display device according to a first example of structure, when a counterclockwise direction is set to be a positive direction and a clockwise direction is set to be a negative direction, the director D of liquid crystal molecules in the liquid crystal display panel LPN is set within a range of 225°±20° or within a range of 315°±20°, relative to the reference azimuth, i.e. the 0° azimuth on the positive side of the X axis. in this description, the director D is set at 225° azimuth. In the optical element OD, the absorption axis 61A of the polarizer plate 61 is set at 60° azimuth relative to the reference azimuth, the slow axis E1 of the first retardation plate RF1 is set at 347° azimuth relative to the reference azimuth direction, and the slow axis E2 of the second retardation plate RF2 is set at 49° azimuth relative to the reference azimuth. The in-plane phase difference of the first retardation plate RF1 is set at 265 nm, and the in-plane phase difference of the second retardation plate RF2 is set at 118 nm.

The viewing angle dependency of the contrast ratio of the liquid crystal display device according to the first example of structure was simulated, and a simulation result as shown in FIG. 17 was obtained. As shown in FIG. 17, symmetric contrast characteristics were obtained in the vertical direction (90°-270° azimuth) and horizontal direction (0°-180° azimuth) of the screen. No gray level inversion was confirmed at 0°, 90°, 180° and 270° azimuth. On the basis of the result shown in FIG. 17, it is clear that the same advantageous effect is obtained if the director D is set, as well as at 225°, in the range of 225°±20° (i.e. the range between 205° and 245°). In this case, in the optical element OD, the axes of the respective components may be set such that the directions of the axes relative to the director D, which is set at 225°, may be maintained. Specifically, it should suffice if the absorption axis 61A of the polarizer plate 61 is set at 60°±20°, the slow axis E1 of the first retardation plate RF1 is set at 347°±20°, and the slow axis E2 of the second retardation plate RF2 is set at 49°±20°. As is clear, the same advantageous effect is obtained even if the director D is set in the range of 315°±20° (i.e. the range between 295° azimuth and 335° azimuth). In this case, too, in the optical element OD, the axes of the respective components may be set such that the directions of the axes relative to the director D, which is set at 225°, may be maintained.

As regards the liquid crystal display device according to the first example of structure, the variation of hue on the screen was measured when the viewing angles were varied in the vertical direction of the screen and the horizontal direction of the screen, and the measured variation was represented on a chromaticity coordinate diagram. FIG. 18 shows the obtained result. It was confirmed that even when the viewing angle is varied, the variation in hue on the white-display screen was small.

In a liquid crystal display device according to a second example of structure, the director D of liquid crystal molecules in the liquid crystal display panel LPN is set at 270° relative to the reference azimuth. In the optical element OD, the absorption axis 61A of the polarizer plate 61 is set at 15°±0.5° azimuth relative to the reference azimuth, the slow axis E1 of the first retardation plate RF1 is set at 30°±0.5° azimuth relative to the reference azimuth, and the slow axis E2 of the second retardation plate RF2 is set at 90°±0.5° azimuth relative to the reference azimuth. The in-plane phase difference of the first retardation plate RF1 is set at 265 nm, and the in-plane phase difference of the second retardation plate RF2 is set at 118 nm.

Figure 19:
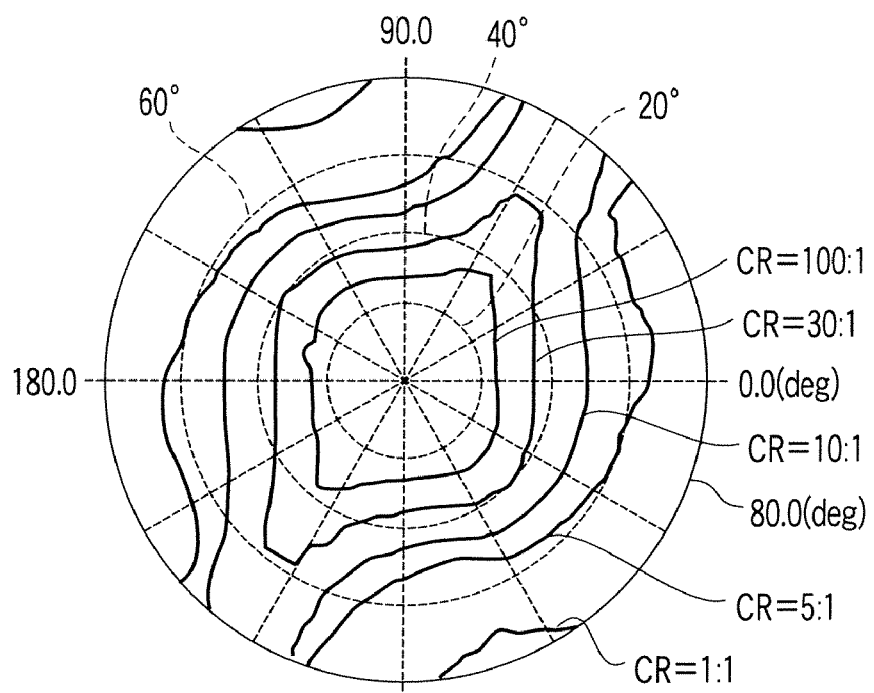
FIG. 19 is a characteristic diagram of the viewing angle dependency of a contrast ratio in a liquid crystal display device according to a second example of structure.

The viewing angle dependency of the contrast ratio of the liquid crystal display device according to the second example of structure was simulated, and a simulation result as shown in FIG. 19 was obtained. As shown in FIG. 19, substantially symmetric contrast characteristics were obtained in the vertical direction (90°-270° azimuth) and horizontal direction (0°-180° azimuth) of the screen. No gray level inversion was confirmed at 0°, 90°, 180° and 270° azimuth.

Figure 20:
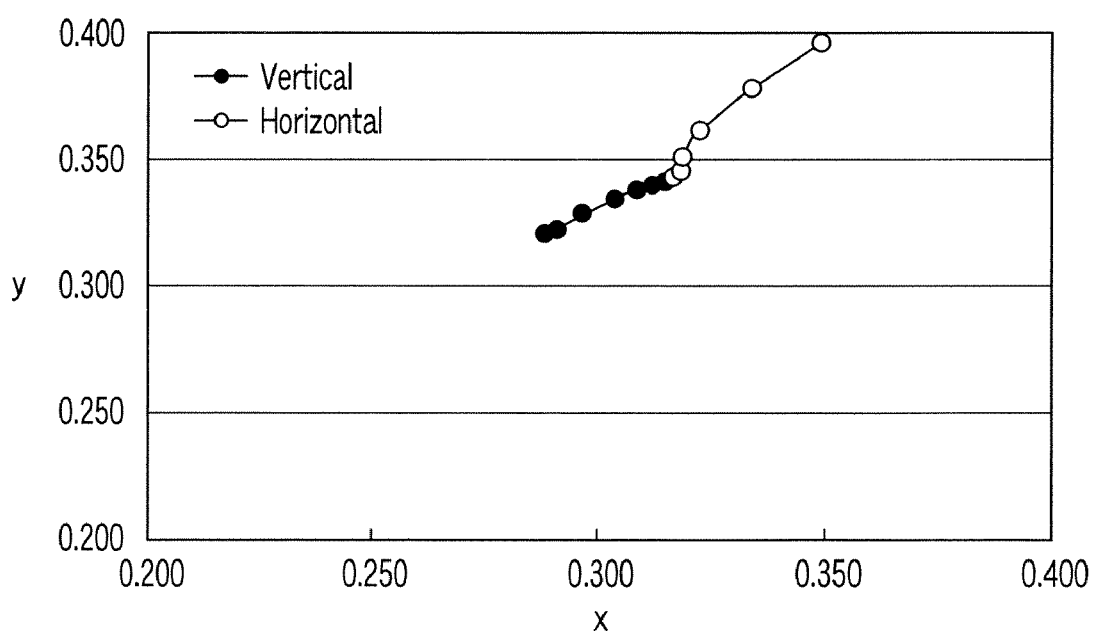
FIG. 20 is a chromaticity coordinate diagram showing the hue of a white screen in the liquid crystal display device according to the second example of structure.

As regards the liquid crystal display device according to the second example of structure, the variation of hue on the screen was measured when the viewing angles were varied in the vertical direction of the screen and the horizontal direction of the screen, and the measured variation was represented on a chromaticity coordinate diagram. FIG. 20 shows the obtained result. It was confirmed that even when the viewing angle is varied, the variation in hue on the white-display screen was small.

In the first and second examples of structure, a uniaxial retardation plate with an Nz coefficient of 1.0 was applied to each of the first retardation plate RF1 and second retardation plate RF2 of the optical element OD. The Nz coefficient is defined as a value that is given as Nz=(nx−nz)/(nx−ny), where nx and ny are refractive indices in mutually perpendicular directions in the plane of the retardation plate, and nz is a refractive index in the normal direction of the retardation plate.

In a liquid crystal display device according to a third example of structure, the director D of liquid crystal molecules in the liquid crystal display panel LPN is set at 270° relative to the reference azimuth. In the optical element OD, the absorption axis 61A of the polarizer plate 61 is set at 15°±0.5° azimuth relative to the reference azimuth, the slow axis E1 of the first retardation plate RF1 is set at 30°±0.5° azimuth relative to the reference azimuth, and the slow axis E2 of the second retardation plate RF2 is set at 90°±0.5° azimuth relative to the reference azimuth. The in-plane phase difference of the first retardation plate RF1 is set at 265 nm, and the in-plane phase difference of the second retardation plate RF2 is set at 118 nm. In the third example of structure, a retardation plate with an Nz coefficient set in the range of less than 1.0 (preferably less than 0.3) was applied to at least one of the first retardation plate RF1 and second retardation plate RF2.

Figure 21:
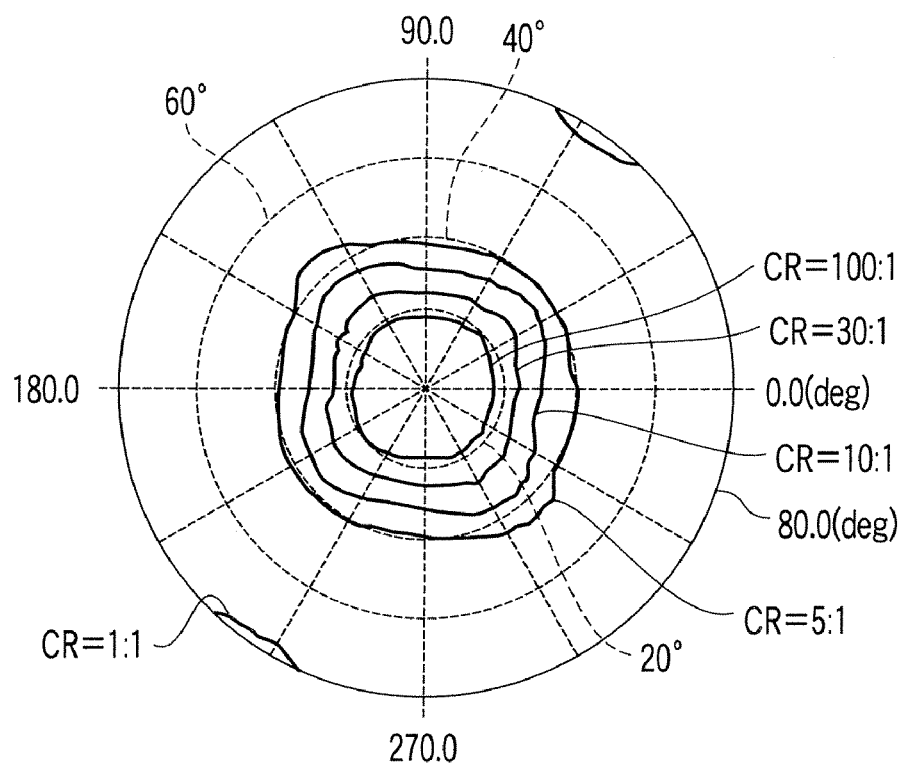
FIG. 21 is a characteristic diagram of the viewing angle dependency of a contrast ratio in a liquid crystal display device according to a third example of structure.

As regards the liquid crystal display device according to the third example of structure wherein a retardation plate with an Nz coefficient of 0.1 is applied to each of the first retardation plate RF1 and second retardation plate RF2, the viewing angle dependency of the contrast ratio was simulated, and a simulation result as shown in FIG. 21 was obtained. As shown in FIG. 21, substantially symmetric contrast characteristics were obtained in the vertical direction (90°-270° azimuth) and horizontal direction (0°-180° azimuth) of the screen. No gray level inversion was confirmed at 0°, 90°, 180° and 270° azimuth.

Figure 22:
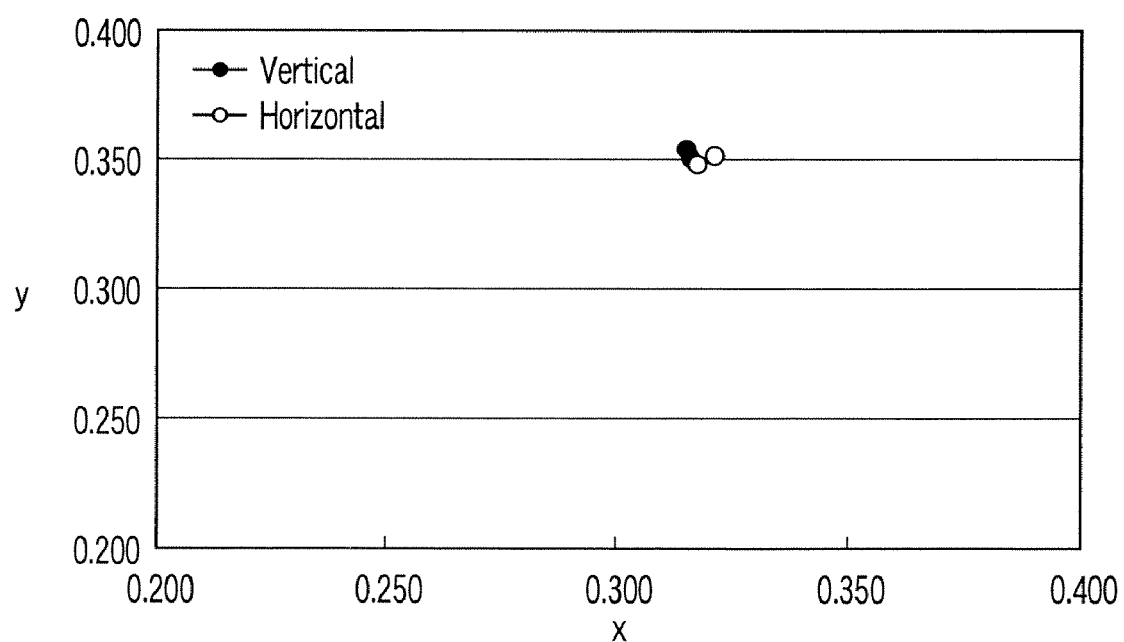
FIG. 22 is a chromaticity coordinate diagram showing the hue of a white screen in the liquid crystal display device according to the third example of structure.

As regards the liquid crystal display device according to the third example of structure wherein the retardation plate with the Nz coefficient of 0.1 is applied to each of the first retardation plate RF1 and second retardation plate RF2, the variation of hue on the screen was measured when the viewing angles were varied in the vertical direction of the screen and the horizontal direction of the screen, and the measured variation was represented on a chromaticity coordinate diagram. FIG. 22 shows the obtained result. It was confirmed that even when the viewing angle is varied, the variation in hue on the white-display screen was small.

Figure 23:
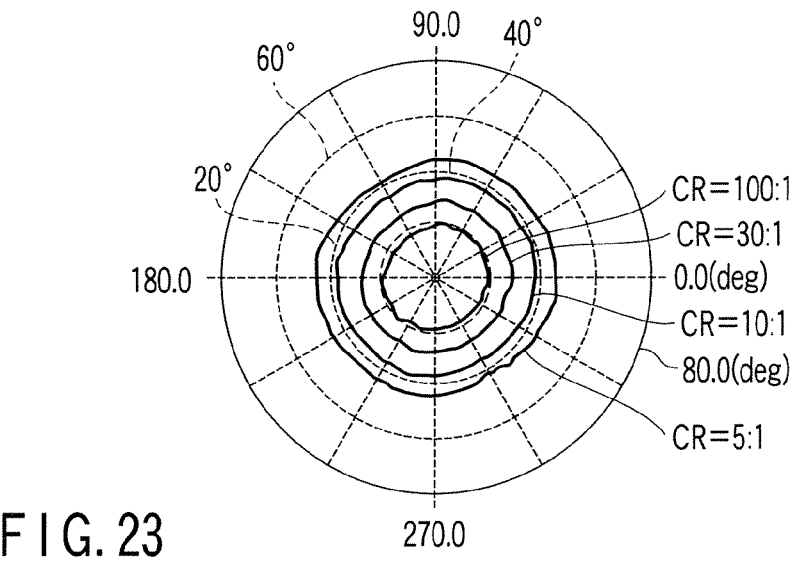
FIG. 23 is a characteristic diagram of the viewing angle dependency of a contrast ratio in another liquid crystal display device according to the third example of structure.

As regards the liquid crystal display device according to the third example of structure wherein a retardation plate with an Nz coefficient of 1.0 is applied to the first retardation plate RF1 and a retardation plate with an Nz coefficient of 0.1 is applied to the second retardation plate RF2, the viewing angle dependency of the contrast ratio was simulated, and a simulation result as shown in FIG. 23 was obtained. As shown in FIG. 23, substantially symmetric contrast characteristics were obtained in the vertical direction (90°-270° azimuth) and horizontal direction (0°-180° azimuth) of the screen. No gray level inversion was confirmed at 0°, 90°, 180° and 270° azimuth.

Figure 24:
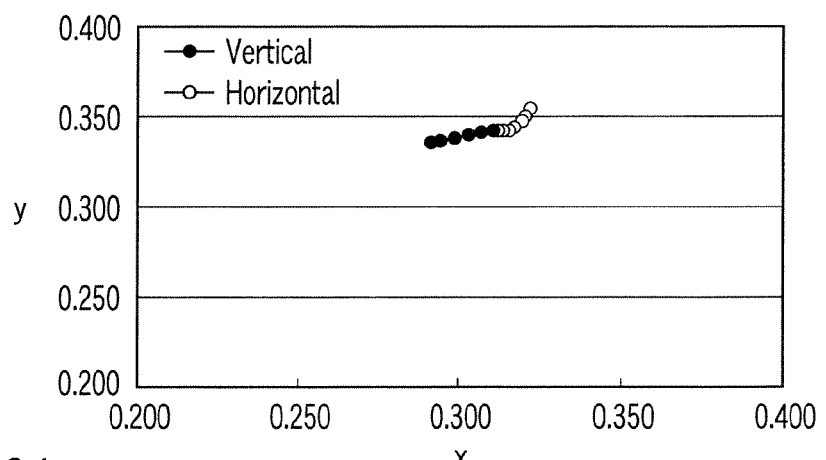
FIG. 24 is a chromaticity coordinate diagram showing the hue of a white screen in the another liquid crystal display device according to the third example of structure.

As regards the liquid crystal display device according to the third example of structure wherein the retardation plate with the Nz coefficient of 1.0 is applied to the first retardation plate RF1 and the retardation plate with the Nz coefficient of 0.1 is applied to the second retardation plate RF2, the variation of hue on the screen was measured when the viewing angles were varied in the vertical direction of the screen and the horizontal direction of the screen, and the measured variation was represented on a chromaticity coordinate diagram. FIG. 24 shows the obtained result. It was confirmed that even when the viewing angle is varied, the variation in hue on the white-display screen was small.

The same result is obtained with respect to a liquid crystal display device wherein a retardation plate with an Nz coefficient of 0.1 is applied to the first retardation plate RF1 and a retardation plate with an Nz coefficient of 1.0 is applied to the second retardation plate RF2. It was confirmed that by applying a retardation plate with an Nz coefficient of less than 1 to at least one of the first retardation plate RF1 and second retardation plate RF2, a good display quality is obtained not only when the screen is observed in the normal direction but also when the screen is observed in an oblique direction.

As has been described above, in the monochromatic reflective liquid crystal display device including twist-aligned liquid crystal molecules with a twist angle of 70°±10°, the retardation value $\Delta n \cdot d$ of the liquid crystal layer is set at 200 ±30 nm. In addition, (1) the director of liquid crystal molecules is set in an azimuth direction within a predetermined range, or (2) the absorption axis of the polarizer plate, the slow axis of the first retardation plate and the slow axis of the second retardation plate are set in azimuth directions within predetermined ranges, or (3) a retardation plate with an Nz coefficient of less than 1 is applied to at least one of the first retardation plate RF1 and second retardation plate RF2. Thereby, even when the screen is observed in an oblique direction, gray level inversion or a variation in hue of a white image was suppressed, and a good display quality was successfully maintained.

As has been described above, according to the monochromatic reflective liquid crystal display device according to the embodiment, an image with good display quality can be displayed.

The present invention is not limited directly to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

For example, in the embodiment, the switching elements are formed of n-channel thin-film transistors. Other structures may be adopted if similar driving signals can be generated.

Figure 25:
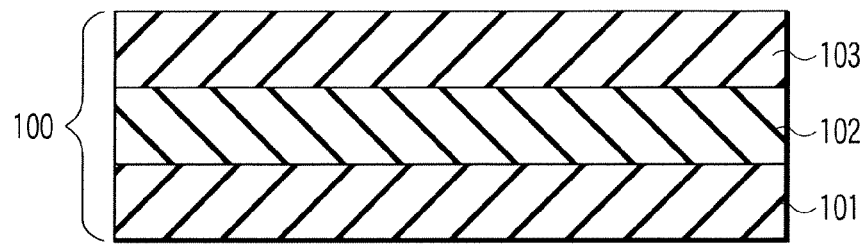
FIG. 25 schematically shows another structure of the optical element that is applicable to the liquid crystal display device shown in FIG. 2.

In addition, the combination of the polarizer plate 61 and first retardation plate RF1, which are structural components of the optical element OD, may be formed of an optical element 100, as shown in FIG. 25, which includes a support layer 101, a polarizer layer 102 disposed on the support layer 101, and a retardation layer 103 which is disposed on the polarizer layer 102, is formed of a cycloolefin polymer and imparts a phase difference of ½ wavelength between light rays of a predetermined wavelength, which pass through the fast axis and slow axis thereof. The support layer 101 may be formed of triacetate cellulose (TAC). The polarizer layer 102 may be formed of polyvinyl alcohol (PVA) that is dyed. By applying the optical element 100, the number of components of the optical element OD can be reduced and the reduction in thickness and cost can be realized.

What is claimed is:

1. A liquid crystal display device comprising:
a liquid crystal display panel comprising a first substrate having a plurality of reflection patterns protruding from a major surface of the first substrate, a second substrate disposed to be opposed to the first substrate, and a liquid crystal layer including liquid crystal molecules, which are twist-aligned at a twist angle of 70°±10°, held between the first substrate and the second substrate; and
an optical element provided on an outer surface of the second substrate,
wherein the optical element includes a polarizer plate, a first retardation plate which is disposed between the polarizer plate and the liquid crystal display panel and imparts a phase difference of a ½ wavelength between light rays of a predetermined wavelength, which pass through a fast axis and a slow axis of the first retardation plate, and a second retardation plate which is disposed between the first retardation plate and the liquid crystal display panel and imparts a phase difference of a ¼ A wavelength between light rays of a predetermined wavelength, which pass through a fast axis and a slow axis of the second retardation plate,
a retardation value $\Delta n \cdot d$ of the liquid crystal layer is set at 200 nm ±30 nm, where $\Delta n$ is a refractive index anisotropy of the liquid crystal layer and d is a thickness of the liquid crystal layer, and
wherein a horizontal direction of the major surface of either of the first and second substrates is a reference azimuth, a counterclockwise direction relative to the reference azimuth is a positive direction and a clockwise direction relative to the reference azimuth is a negative direction, a director of the liquid crystal molecules is set within a range of 225°±20° or a range of 315°±20° relative to the reference azimuth.

2. The liquid crystal display device according to claim 1, wherein a maximum inclination angle of the reflection pattern is 9°±2°, in a case where the maximum inclination angle is an inclination angle with a highest degree of inclination angles of the reflection pattern relative to the major surface of the substrate.

3. The liquid crystal display device according to claim 1, wherein the reflection pattern has such a shape as to have a major axis in a plane of the major surface of the substrate.

4. The liquid crystal display device according to claim 3, wherein the major axis of each of the reflection patterns is substantially parallel to a horizontal direction of the major surface of the substrate.

5. A liquid crystal display device comprising:
a liquid crystal display panel comprising a first substrate having a plurality of reflection patterns protruding from a major surface of the first substrate, a second substrate disposed to be opposed to the first substrate, and a liquid crystal layer including liquid crystal molecules, which are twist-aligned at a twist angle of 70°±10°, held between the first substrate and the second substrate; and
an optical element provided on an outer surface of the second substrate,
wherein the optical element includes a polarizer plate, a first retardation plate which is disposed between the polarizer plate and the liquid crystal display panel and imparts a phase difference of ½ wavelength between light rays of a predetermined wavelength, which pass through a fast axis and a slow axis of the first retardation plate, and a second retardation plate which is disposed between the first retardation plate and the liquid crystal display panel and imparts a phase difference of a ¼ A wavelength between light rays of a predetermined wavelength, which pass through a fast axis and a slow axis of the second retardation plate, a retardation value $\Delta n \cdot d$ of the liquid crystal layer is set at 200 nm ±30 nm, where $\Delta n$ is a refractive index anisotropy of the liquid crystal layer and d is a thickness of the liquid crystal layer, and wherein a horizontal direction of the major surface of either of the first and second substrates is a reference azimuth, a director of the liquid crystal molecules is set at 270° relative to the reference azimuth, an absorption axis of the polarizer plate is set at 15°±0.5° relative to the reference azimuth, and a slow axis of the second retardation plate is set at 90°±0.5° relative to the reference azimuth.

6. The liquid crystal display device according to claim 5, wherein a maximum inclination angle of the reflection pattern is 9°±2°, in a case where the maximum inclination angle is an inclination angle with a highest degree of inclination angles of the reflection pattern relative to the major surface of the substrate.

7. The liquid crystal display device according to claim 5, wherein the reflection pattern has such a shape as to have a major axis in a plane of the major surface of the substrate.

8. The liquid crystal display device according to claim 7, wherein the major axis of each of the reflection patterns is substantially parallel to a horizontal direction of the major surface of the substrate.

9. A liquid crystal display device comprising:

a liquid crystal display panel comprising a first substrate having a plurality of reflection patterns protruding from a major surface of the first substrate, a second substrate disposed to be opposed to the first substrate, and a liquid crystal layer including liquid crystal molecules, which are twist-aligned at a twist angle of 70°±10°, held between the first substrate and the second substrate; and an optical element provided on an outer surface of the second substrate, wherein the optical element includes a polarizer plate, a first retardation plate which is disposed between the polarizer plate and the liquid crystal display panel and imparts a phase difference of a ½ wavelength between light rays of a predetermined wavelength, which pass through a fast axis and a slow axis of the first retardation plate, and a second retardation plate which is disposed between the first retardation plate and the liquid crystal display panel and imparts a phase difference of a ¼ λ wavelength between light rays of a predetermined wavelength, which pass through a fast axis and a slow axis of the second retardation plate, a retardation value $\Delta n \cdot d$ of the liquid crystal layer is set at 200 nm 30 nm, where $\Delta n$ is a refractive index an isotropy of the liquid crystal layer and d is a thickness of the liquid crystal layer, and with respect to at least one of the first retardation plate and the second retardation plate, an Nz coefficient, which is defined by $(nx-nz)/(nx-ny)$, is set in a range of less than 1, where nx and ny are refractive indices in mutually perpendicular directions in a plane of said at least one of the first retardation plate and the second retardation plate, and nz is a refractive index in a normal direction to the plane.

10. The liquid crystal display device according to claim 9, wherein a maximum inclination angle of the reflection pattern is 9°±2°, in a case where the maximum inclination angle is an inclination angle with a highest degree of inclination angles of the reflection pattern relative to the major surface of the substrate.

11. The liquid crystal display device according to claim 9, wherein the reflection pattern has such a shape as to have a major axis in a plane of the major surface of the substrate.

12. The liquid crystal display device according to claim 11, wherein the major axis of each of the reflection patterns is substantially parallel to a horizontal direction of the major surface of the substrate.

* * * * *